United States Patent
Shirai

(10) Patent No.: US 8,773,691 B2
(45) Date of Patent: Jul. 8, 2014

(54) PRINTING CONTROL APPARATUS, PRINTING CONTROL METHOD, AND STORAGE MEDIUM

(75) Inventor: Kenichi Shirai, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 12/880,539

(22) Filed: Sep. 13, 2010

(65) Prior Publication Data

US 2011/0063668 A1 Mar. 17, 2011

(30) Foreign Application Priority Data

Sep. 16, 2009 (JP) ................................. 2009-214744

(51) Int. Cl.
- *G06F 3/12* (2006.01)
- *G06K 15/02* (2006.01)
- *G06F 3/00* (2006.01)
- *H04N 1/00* (2006.01)

(52) U.S. Cl.
USPC ......... 358/1.15; 358/1.1; 358/1.13; 358/1.14; 358/501; 358/401

(58) Field of Classification Search
None
See application file for complete search history.

(56) References Cited

U.S. PATENT DOCUMENTS

| | | | | |
|---|---|---|---|---|
| 2001/0013053 A1* | 8/2001 | Yamazaki | ...................... | 709/203 |
| 2007/0234354 A1* | 10/2007 | Hattori | .......................... | 717/177 |
| 2008/0170253 A1* | 7/2008 | Mohammad | ................. | 358/1.15 |
| 2008/0256486 A1* | 10/2008 | Hagiwara | ..................... | 715/810 |
| 2010/0020349 A1* | 1/2010 | Carroll | ......................... | 358/1.15 |

FOREIGN PATENT DOCUMENTS

| | | | | |
|---|---|---|---|---|
| JP | 07-311665 | * 11/1995 | ................ | G06F 3/12 |
| JP | 2000-250729 A | 9/2000 | | |
| JP | 2000-259375 A | 9/2000 | | |
| JP | 2002-169675 A | 6/2002 | | |
| JP | 2004-058306 A | 2/2004 | | |
| JP | 2008-210086 A | 9/2008 | | |

* cited by examiner

*Primary Examiner* — King Poon
*Assistant Examiner* — Beniyam Menberu
(74) *Attorney, Agent, or Firm* — Canon U.S.A., Inc. IP Division

(57) ABSTRACT

To make it easier for a user to print at an intended printing apparatus when performing printing with a printing apparatus which is managed by a server, among printers which were accessed by the user who is a request source, and are at the same location as that specified by the user, the printer capable of printing based on the print setting corresponding to that user is determined as the printing destination.

5 Claims, 16 Drawing Sheets

FIG. 6A

600 USER INFORMATION

| USER NAME |
|---|
| A |

601 PRINT SETTING INFORMATION

| PRINT SETTING | USAGE LOCATION |
|---|---|
| DOUBLE-SIDED COLOR | BASE LOCATION A ROOM A |
| SINGLE-SIDED MONOCHROME | BASE LOCATION A ROOM A |
| 2-in-1 COLOR DOUBLE-SIDED | BASE LOCATION A ROOM A |
| BOOKBINDING | BASE LOCATION B ROOM C |
| ... | ... |

602 ACCESS INFORMATION

| PRINTER NAME | LAST ACCESS DATE | ACCESS NUMBER |
|---|---|---|
| MFP001 | 200x/a/b | 20 |
| SFP001 | 200x/c/d | 5 |
| MFP002 | 200x/e/f | 3 |
| MFP100 | 200x/g/h | 1 |
| ... | ... | ... |

FIG. 6B

609 PRINTER INFORMATION

| INSTALLATION LOCATION | PRINTER NAME | PRINTING CAPABILITY | STATUS |
|---|---|---|---|
| BASE LOCATION A ROOM A | MFP001 | DOUBLE-SIDED, COLOR, NUP, BOOKBINDING | NORMAL |
| BASE LOCATION A ROOM A | MFP002 | MONOCHROME, DOUBLE-SIDED | ERROR |
| BASE LOCATION A ROOM A | SFP001 | MONOCHROME, SINGLE-SIDED | NORMAL |
| ... | ... | ... | ... |
| BASE LOCATION A ROOM Z | SFP098 | MONOCHROME, SINGLE-SIDED | NORMAL |
| BASE LOCATION B ROOM C | MFP099 | DOUBLE-SIDED, COLOR, NUP, BOOKBINDING | NORMAL |
| BASE LOCATION B ROOM C | MFP100 | DOUBLE-SIDED MONOCHROME, NUP, BOOKBINDING | NORMAL |
| ... | ... | ... | ... |

```
REGISTER PRINT SETTING

SELECT PRINT SETTING TO BE REGISTERED
LOCATION INFORMATION: STARTING POINT A > OFFICE ROOM A

◉ SINGLE-SIDED    ○ DOUBLE-SIDED
○ MONOCHROME      ◉ COLOR
◉ 2in1            ○ 4in1            ○ NONE
◉ STAPLE          ○ DON'T STAPLE
○ BOOKBIND        ◉ DON'T BOOKBIND

[ OK ]    [ CANCEL ]
```

1308

PRINTING CONTROL APPARATUS, PRINTING CONTROL METHOD, AND STORAGE MEDIUM

BACKGROUND OF THE INVENTION

1. Field of the Invention

The present invention relates to a printing control apparatus, a printing control method, and a storage medium. The present invention is especially suitable when used for printing with a printing apparatus managed by a server.

2. Description of the Related Art

In order to strengthen internal control and security, and to reduce personal computer (PC) management costs, the trend towards using thin clients, in which applications are not installed in a client PC even in an office environment, is accelerating. In conjunction with this, printing systems in which a print server manages all of the printers and manages the print jobs is now mainstream even in printing work. In such a printing system, the PC client does not hold the printer drivers or printer objects.

Thus, when managing all printers with a print server, the number of printers being managed increases dramatically. Consequently, a user who is performing printing has to select a printer from among a large number of printers. Therefore, in order to select a suitable printer, the user has to know in advance information about the printer drivers, the printer capabilities and the like. Especially, in an environment in which a mobile terminal whose location is not specified is used as the client terminal, the amount of printer information that can be obtained by the client terminal can be low. In such a case, in actual practice it can take some time until printing can be started. In view of this situation, Japanese Patent Application Laid-Open No. 2004-58306 discusses a system in which the print server automatically selects the printer which is suited to the printing conditions.

However, in the technology discussed in Japanese Patent Application Laid-Open No. 2004-58306, since the printer is automatically selected by the print server based on only the printing conditions, the automatically selected printer may not be a printer known to the user, and a print product may be output at an unintended location. Therefore, user-friendliness and print product security are not guaranteed. Further, to change the printer for outputting the print product from the automatically selected printer to a closer printer, the user has to specify that printer from among a large number of printers. Moreover, the user has to perform other tasks, such as setting the printer driver. Consequently, it is not easy to output a print product from a closer printer.

SUMMARY OF THE INVENTION

The present invention is directed to making it easier for a user to print at an intended printing apparatus when performing printing with a printing apparatus which is managed by a server.

According to an aspect of the present invention, a printing control apparatus includes a reception unit configured to receive a print request from a user, an acquisition unit configured to acquire a printing apparatus usage history of the user who made the print request and print setting information registered by the user who made the print request, and a determination unit configured to determine, based on the usage history and the print setting information acquired by the acquisition unit, a printing apparatus which has been used by the user who made the print request and which is capable of printing based on the print setting information registered by that user as an execution destination for printing based on the print request.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B illustrate information managed by a printer management unit.

FIGS. 13A, 13B, and 13C illustrate a user interface on a web browser.

DESCRIPTION OF THE EMBODIMENTS

Various exemplary embodiments, features, and aspects of the invention will be described in detail below with reference to the drawings.

Figure 1:
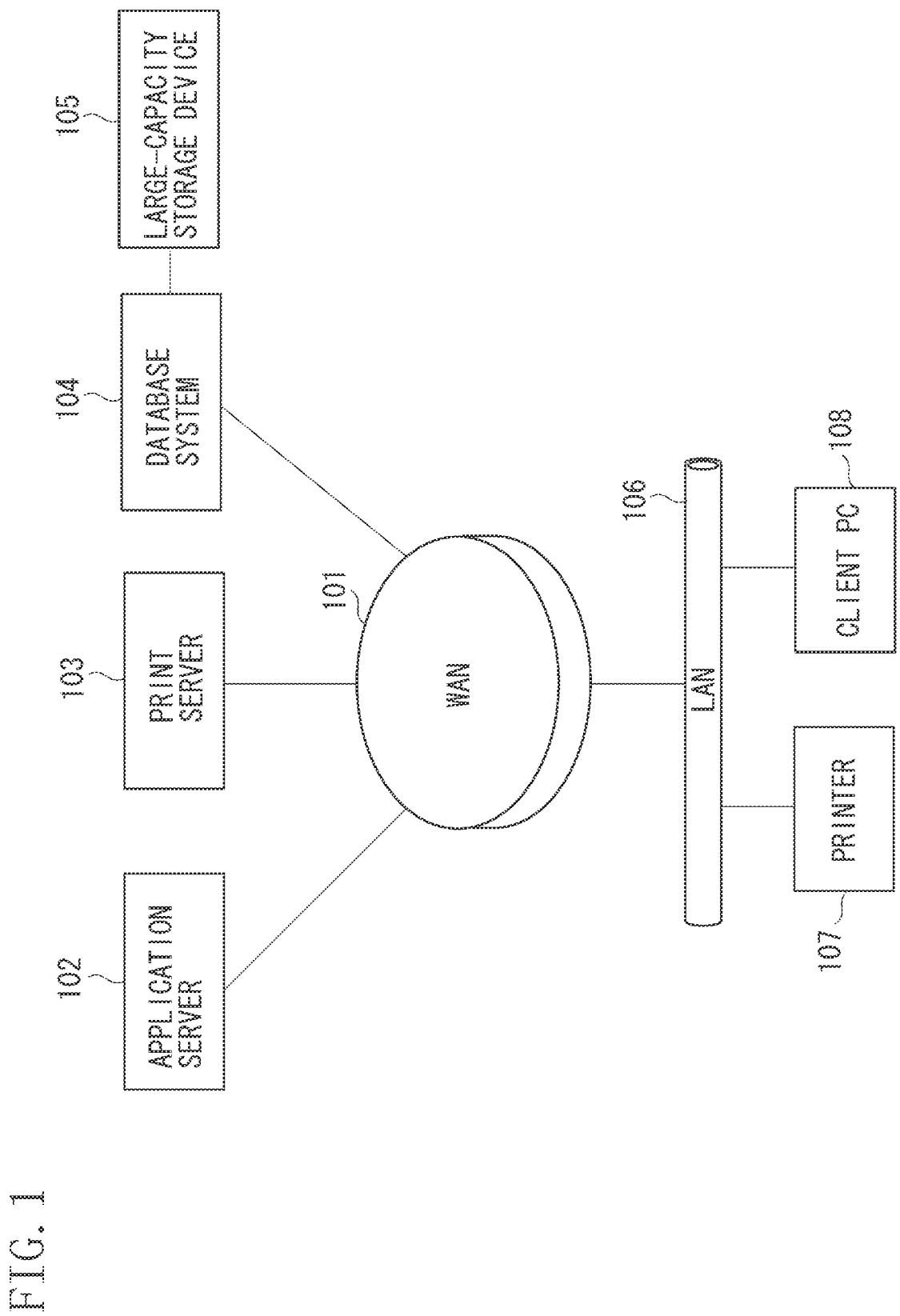
FIG. 1 illustrates a configuration of a printing control system.

FIG. 1 illustrates an example of a configuration of a printing control system.

In FIG. 1, a printer 107 and a client PC 108 are both connected via a wide area network (WAN) 101, which is an example of a network, to an application server 102, a print server 103, and a database system 104, respectively.

The application server 102, via the WAN 101, stores document data in a large-capacity storage device 105, converts document data into a printable print job for storage in the large-capacity storage device 105, and sends the stored document data to the client PC 108. Further, the application server 102 receives print instructions and print job operations from the client PC 108, and sends instructions to the print server 103. In the present exemplary embodiment, the application server 102 is a "web application server" which provides applications operated by the client PC 108's web browser.

The print server 103 performs processing such as monitoring and management of the printer 107, control and monitoring of the print jobs, and transfer of the print jobs to the printer 107. Further, the print server 103 communicates with the database system 104 and the application server 102 via the WAN 101, and manages the printer 107, the print setting information, and the print jobs used by the client PC 108.

The database system 104 is a server computer which manages the large-capacity storage device 105. The large-capacity storage device 105 stores document data, print jobs, print job information, printer information and the like produced by the application server 102. Another server (application server 102, print server 103 etc.) issues a request to the database system 104 in order to access this information (acquire, update, add, delete data). The database system 104 receives and executes these requests. Further, the application server 102 includes a printer driver for generating print jobs (page description language (PDL) data).

The printer 107 is an image forming apparatus connected to a local area network (LAN) 106. The printer 107 communicates with the application server 102 and the print server 103 via the LAN 106, WAN 101 and the like. The printer 107 can employ any kind of printing apparatus method, such as a laser beam printer employing an electrophotographic method, an inkjet printer employing an inkjet method, and a printer employing a thermal transfer method. Further, in the present embodiment, communication between the apparatuses included in the printing control system can be performed by wired communication using an Ethernet® cable or by wireless communication using electromagnetic waves, light and the like.

The client PC 108 is a PC for performing information processing. Each client PC 108 is connected to the LAN 106, and can communicate with the various server computers via the WAN 101.

The present exemplary embodiment is based on the assumptions that there is a plurality of printers 107 and client PCs 108, and that there is a plurality of the same configurations as the LAN 106, the printer 107, and the client PC 108.

Figure 2:
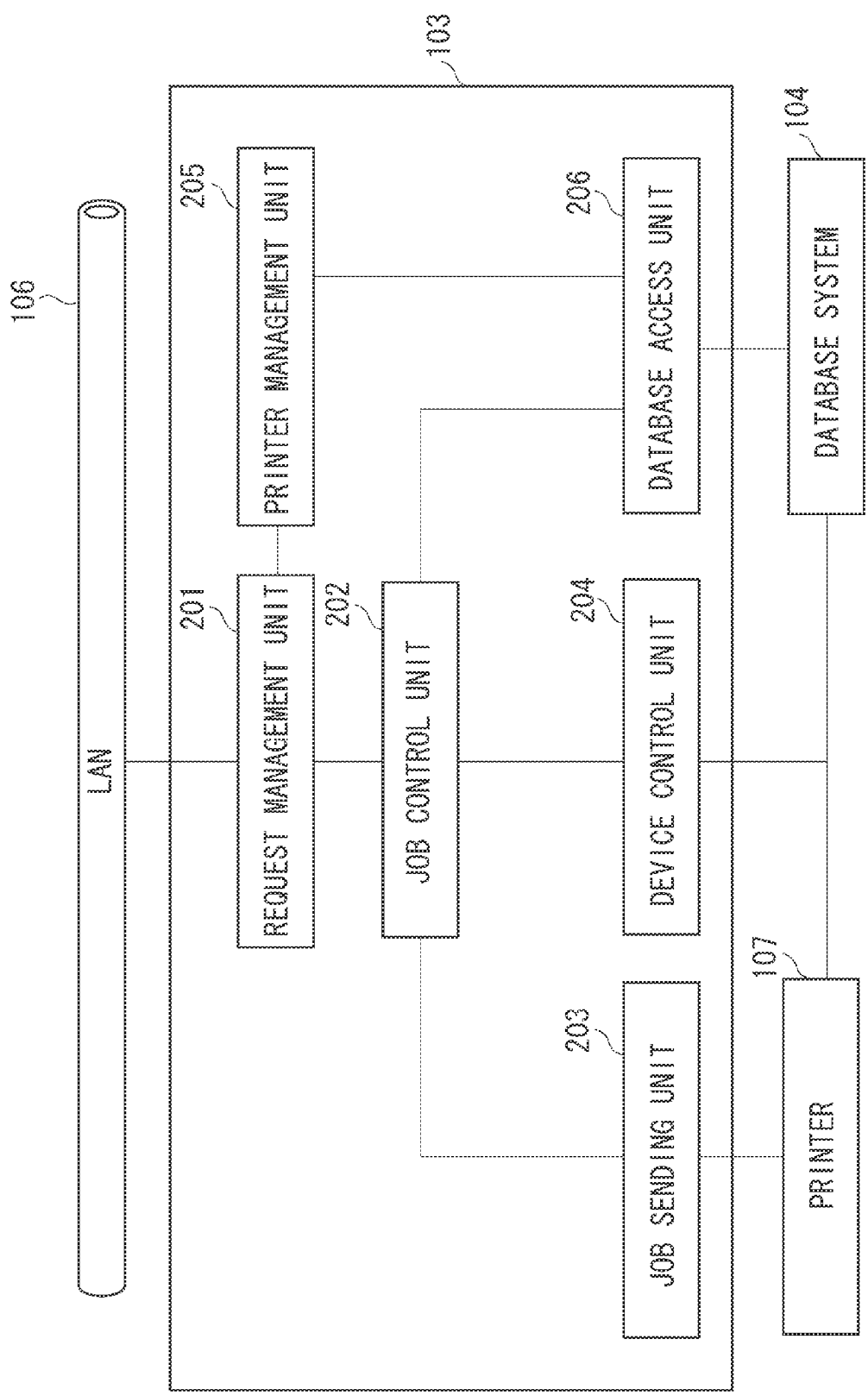
FIG. 2 illustrates a functional configuration of a print server.

FIG. 2 illustrates an example of a functional configuration of the print server 103.

A request management unit 201 receives print requests, registration of print setting information, printing destination requests, and login information from the user via the client PC 108's web browser and the printer 107. A "print request" is a print instruction from the user to the print server 103. "Registration of print setting information" is a request to the print server 103 to register the print setting information desired by the user. A "printing destination request" is a request to the print server 103 to determine the actual printing destination for the print setting information registered by the user. "Login information" is the user's login information notified to the print server 103 from the client PC 108's web browser and the printer 107. Login information from the printer 107 to the print server 103 is notified via an operation unit 406 illustrated in FIG. 4. Further, login information from the web browser is notified using a card reader connected to the printer 107, or by using a remote user interface on the web browser which is displayed on the client PC 108. The registration of print setting information and the login information will be described in more detail below using FIGS. 6 and 7. In addition, in the present exemplary embodiment, although an example is described in which print instruction is performed from the printer 107, print instruction may also be performed from a user interface of the application server 102, for example.

When the request management unit 201 receives a print request, a job control unit 202 acquires print job information and a print job from the database system 104 via a user database access unit 206. When a print job is received, the job control unit 202 makes an enquiry to a device control unit 204 about the status of the printer 107. If the printer 107 is operating normally, a job sending unit 203 sends the print job to the printer 107. In the present exemplary embodiment, the print job is produced by the application server 102, and stored in the database system 104. As an example of another method for producing the print job, the print server 103 may acquire the document data stored in the database system 104, and produce the print job using a printer driver which the print server 103 possesses.

When the request management unit 201 receives a registration of print setting information or login information, a printer management unit 205 updates the information in the database system 104 via the user database access unit 206.

When the request management unit 201 receives a printing destination request, the printer management unit 205 determines the printing destination based on the login information, the print setting information set for each user, access information which is the history of access to the printer, and printer information. The method for determining the printing destination will be described in more detail below using FIG. 8.

Figure 3:
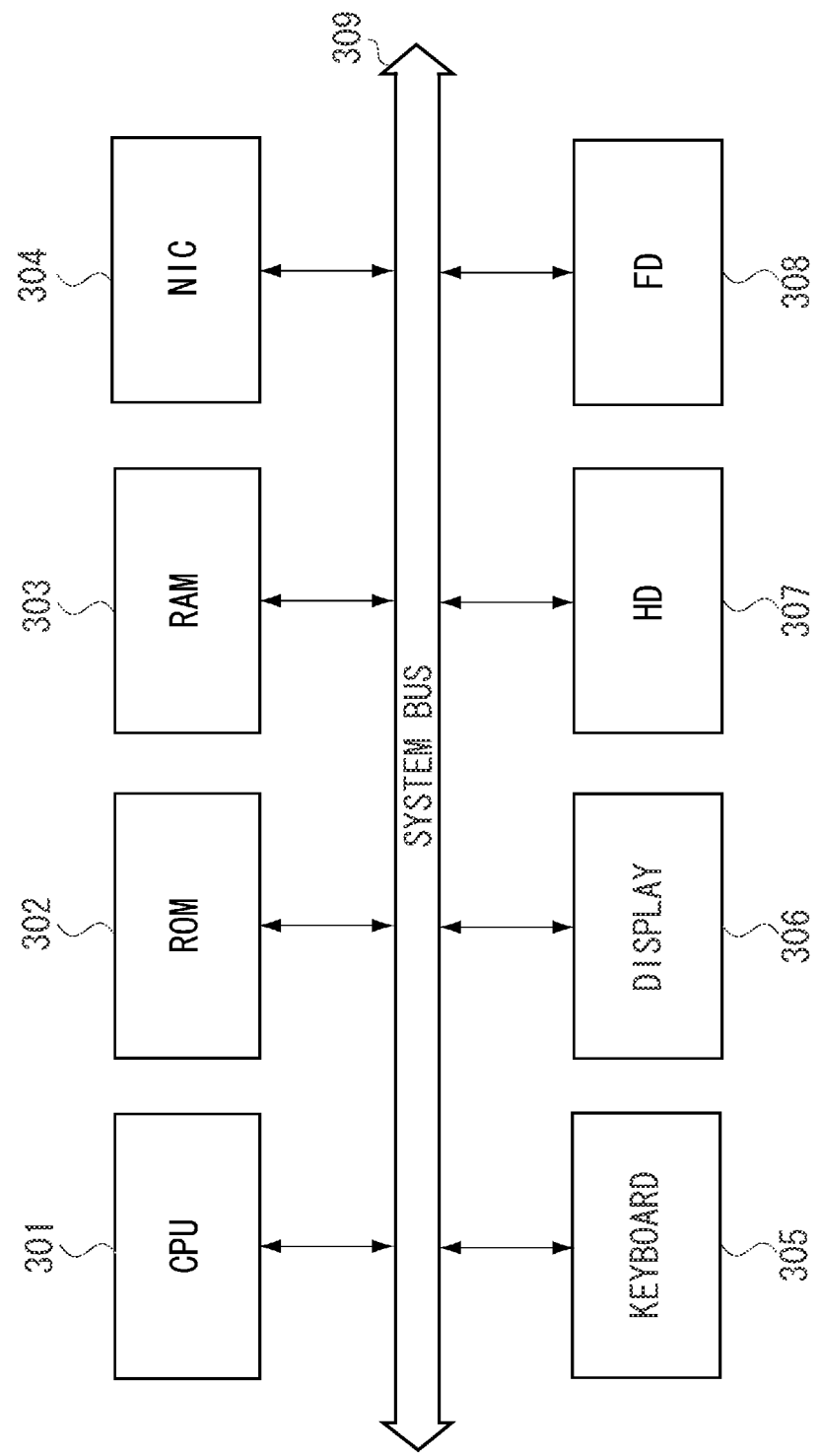
FIG. 3 illustrates a hardware configuration of an information processing apparatus.

FIG. 3 illustrates an example of a hardware configuration of an information processing apparatus. The application server 102, print server 103, database system 104, and client PC 108 have a similar, or the same, configuration as this information processing apparatus. In the present exemplary embodiment, a case is illustrated in which the application server 102, print server 103, and database system 104 are individually provided. However, these units may also be combined together in a single information processing apparatus.

A central processing unit (CPU) 301 is a control apparatus for the information processing apparatus. The CPU 301 executes a computer program (e.g., application program, print driver program, operating system (OS), and the printing control programs illustrated in the below-described flowcharts) stored in a hard disk (HD) 307. Further, the CPU 301 performs a control to temporarily store information, files and the like necessary for execution of the program in a random access memory (RAM) 303. In addition, the CPU 301 opens various registered windows based on a command instructed by a mouse cursor (not illustrated) on a display 306, and executes various kinds of data processing. In the present exemplary embodiment, the print setting information and the print instruction are performed from a web browser displayed on the display 306 of the client PC 108. A read-only memory (ROM) 302 stores various kinds of data, such as a basic I/O program or similar program, font data used during document processing, and template data. The RAM 303 functions as a main memory work area for the CPU 301. An interface (network interface controller (NIC)) 304 is an interface for exchanging data with an external apparatus. A keyboard 305 is a device which allows the user to input an instruction, such as a command, into the information processing apparatus. The display 306 is a device which displays a command and the like input from the keyboard 305. The hard disk (HD) 307 functions as a large-capacity memory, and stores a program (application program, print driver program, OS etc.). A flexible disk (FD) 308 is a portable storage medium. Each of the blocks illustrated in FIG. 3 is connected to the other blocks via a system bus 309.

Figure 4:
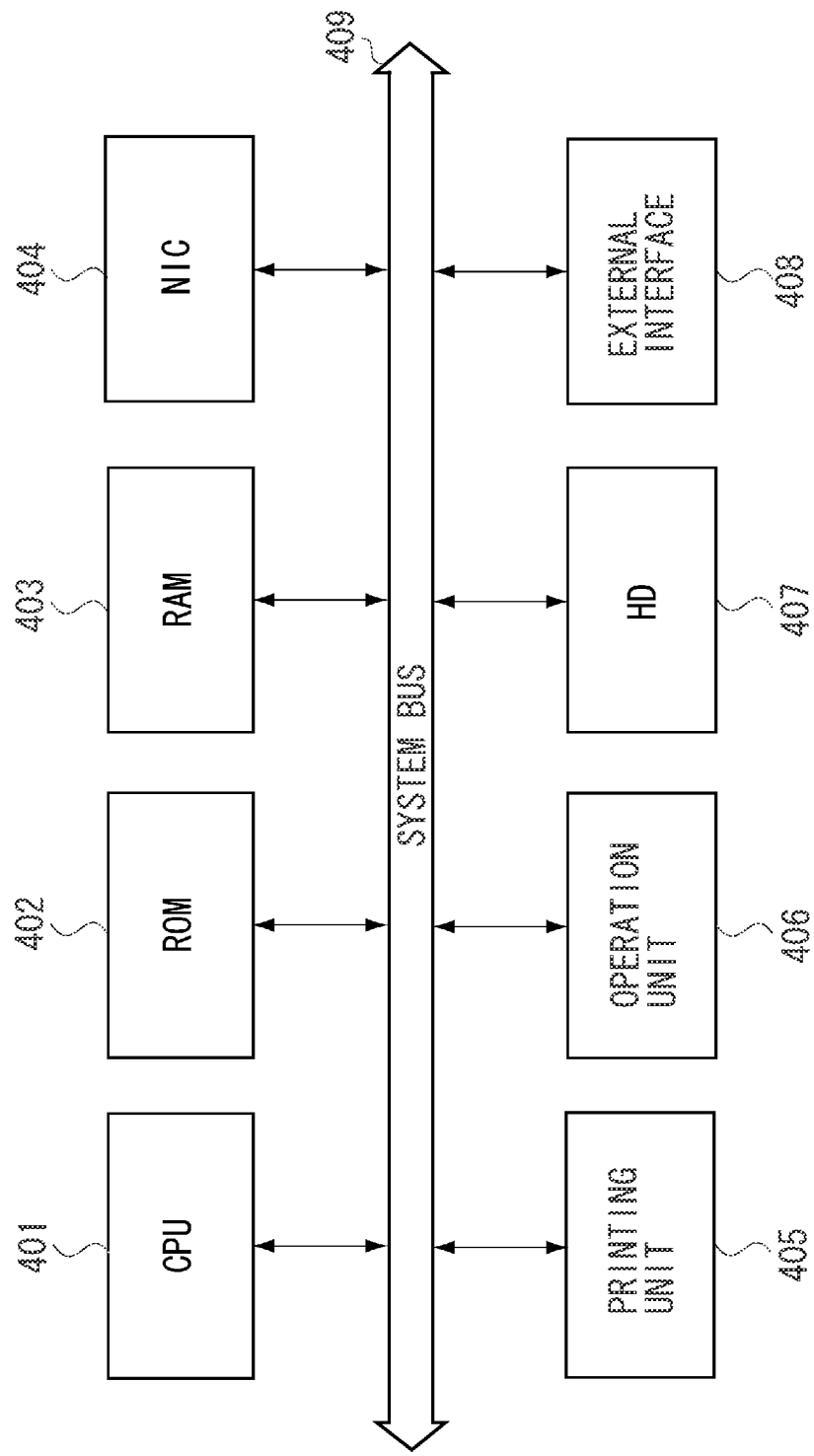
FIG. 4 illustrates a hardware configuration of a printer.

FIG. 4 illustrates an example of a hardware configuration of the printer 107.

A CPU 401 outputs, for example, an image signal as output information to a printing unit 405 (printer engine) connected to the system bus 409 based on a control program. A ROM 402 stores a control program of the CPU 401. Further, if there is no external memory such as a hard disk (HD) 407, the ROM 402 stores the information to be used by the host computer. A RAM 403 functions as a main memory and work area of the CPU 401. Further, the RAM 403 may be used for an output information rasterization region, an environment data storage region, a non-volatile RAM (NVRAM) and the like. An interface (NIC) 404 is an interface for exchanging data with an external apparatus. In the present exemplary embodiment, the CPU 401 notifies the print server 103 about information operated by the user via the interface (NIC) 404. A printing unit 405 processes an image signal input from the CPU 401. The operation unit 406, for example, allows a user to perform inputs to log in to the printer 107, view a print job, and perform job operation. The hard disk (HD) 407 stores font data used when generating output information, control information for the CPU 401 and the like. An IC (integrated circuit) card reader and the like is connected to an external interface 408.

Figure 5A:
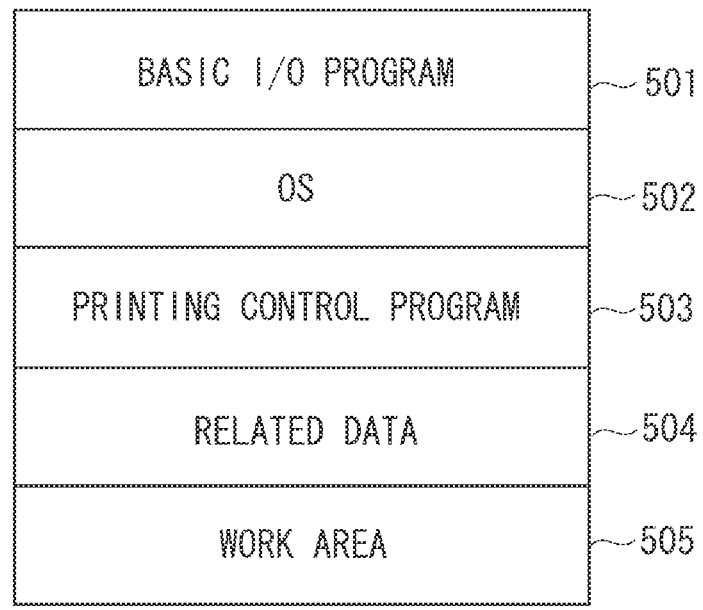
FIGS. 5A and 5B illustrate a RAM memory map.

FIG. 5 illustrates an example of memory maps in the RAM 303 illustrated in FIG. 3. Specifically, FIG. 5A illustrates an example of a memory map in a state in which a printing control program from the FD 308 is loaded into the RAM 303 and can be executed. Further, the printing control program may be preinstalled in the HD 307 and loaded into the RAM 303 therefrom. In addition, the medium storing the printing control program may be a compact disc ROM (CD-ROM), a CD readable (CD-R), a PC card, a digital versatile disc (DVD), an IC memory card and the like. The printing control program may also be stored in the ROM 302, configured such that the printing control program forms apart of the memory map, and is directly executed by the CPU 401. Still further, the printing control program may also be configured as a substitute for the hardware apparatuses by using software to realize functions equivalent to each of the above-described apparatuses.

The basic I/O program 501 is a region which includes a program having an initial program loading (IPL) function which, when the power source of the information processing apparatus is turned ON, reads an OS 502 from the HD 307 into the RAM 303, and starts the operation of the OS 502. A printing control program 503 is a program for executing the processing illustrated in the below-described flowcharts, and is stored in a region secured in the RAM 303. Further, related data 504 is necessary data for execution of the printing control program 503. A work area 505 is a region in which the CPU 301 executes the printing control program 503.

Figure 5B:
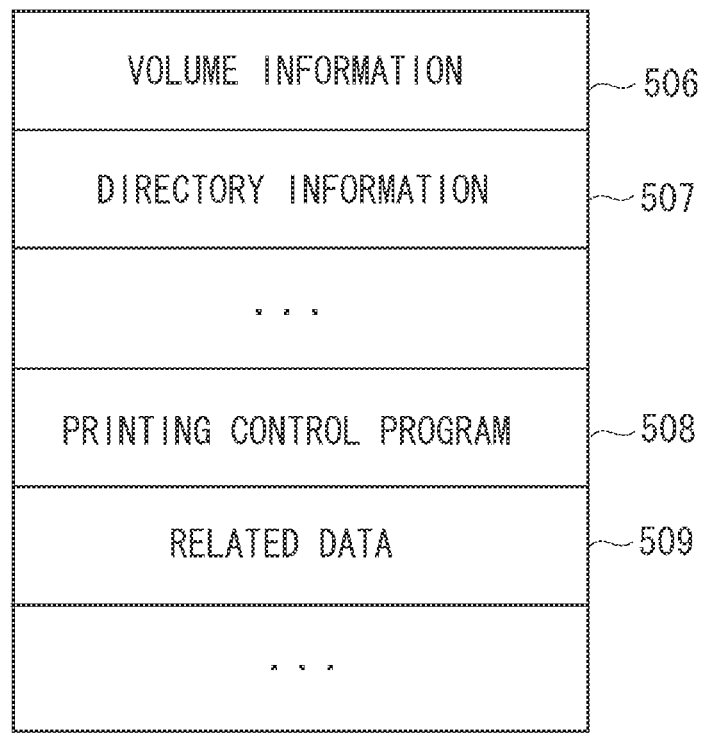

FIG. 5B is an example of a memory map of the FD 308, which illustrates the data contents of the FD 308. The memory map of the FD 308 includes, in addition to volume information 506 representing the amount of data information, directory information 507, a printing control program 508, and related data 509. The printing control program 508 is a program for executing the processing illustrated in the below-described flowcharts.

FIG. 6 illustrates examples of information managed by the printer management unit 205. More specifically, FIG. 6A illustrates an example of user information, print setting information, and access information. FIG. 6B illustrates an example of printer information. The printer management unit 205 registers the print setting information and login information received by the request management unit 201 in the database system 104 via the user database access unit 206. Further, information about the printer 107 managed by the printer management unit 205 is also registered in the database system 104.

A user name 603 of the user who made the request is registered in user information 600. The printer management unit 205 uses the user name 603 to specify which user is described in the information received from the request management unit 201. Print setting information 601 and access information 602 are respectively associated with each user information 600 (each user), and held in the database system 104.

Print setting information 601 is information registered by the user via the web browser displayed on the client PC 108. Print setting information 601 includes a print setting 604 and a usage location 605. The print setting 604 is a combination of the print settings used by the user. A plurality of settings can be registered for each usage location 605. For example, if the settings of double-sided printing and color printing are registered, the user no longer needs to make settings each time printing is performed, so that operability is improved. Examples of settable attributes include single-sided/double-sided printing, color/monochrome printing, N-UP printing, bookbinding printing and the like. The usage location 605 is information indicating the location which utilizes the print setting 604.

Access information 602 is information concerning the usage history of the printer 107 used by the user. The access information 602 is updated by the printer management unit 205. Further, the printer management unit 205 uses the access information 602 to determine the output destination printer for the print setting information 601 registered by the user. The method for determining the output destination printer will be described in more detail below using FIG. 8.

The printer name 606 is a unique name for the printer 107 managed by the printer management unit 205. The printer management unit 205 uses the printer name 606 to specify the printer 107. Further, the printer name is also used as identification information for specifying the printer. Last access date 607 is the date and time when the user accessed the printer 107 having the printer name 606. The last access date 607 is updated by the printer management unit 205. Here, "access" refers to logging in by the user to the printer 107 via the operation unit 406 of the printer 107, or using an external interface 408 such as a card reader. An access number 608 indicates the number of times the user has logged in to the printer 107. The access number 608 is updated by the printer management unit 205.

Printer information 609 is information concerning the printer 107 managed by the printer management unit 205. Printer information 609 includes an installation location 610, a printer name 611, a printing capability 612, and a status 613.

The installation location 610 is information indicating the location where the printer 107 is physically present. The printer name 611 is information for specifying the printer 107. The printer management unit 205 specifies the printer name 606 and the like in the access information 602, and acquires information about the last access date 607 and the access number 608. The printing capability 612 is information indicating the capabilities of the printer 107. The status 613 indicates the status of the printer 107. The status 613 is updated by the device control unit 204.

Figures 7A, 7B:
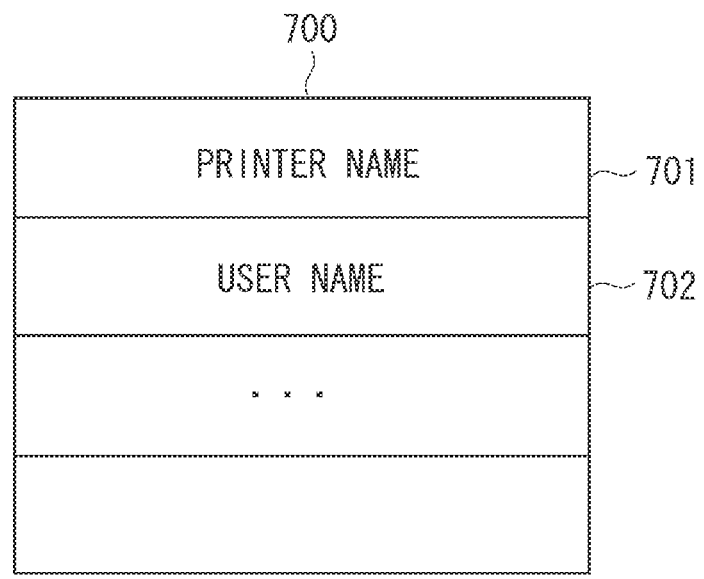
FIGS. 7A and 7B illustrate login information and request information.

FIG. 7 illustrates an example of login information and request information. More specifically, FIG. 7A illustrates an example of login information 700 received from the printer 107. When the user logs in to the printer 107 using the operation unit 406 or the external interface 408 of the printer 107, the printer 107 notifies the print server 103 about the login information 700 via an interface 404. In addition, the login information 700 is notified to the print server 103 via a web browser also when the user logs in to a remote user interface on the web browser as described above.

A printer name 701 is the name of the printer 107. A user name 702 is the name of the user who logged in to the printer 107. When the printer management unit 205 receives the printer name 701 and the user name 702 from the request management unit 201, the printer management unit 205 acquires information corresponding to the printer name 701 and the user name 702 from the database system 104.

FIG. 7B illustrates an example of request information 706 received by the request management unit 201 from the client PC 108. Based on an operation made by the user on the keyboard 305 or the like, the request information 706 is notified to the print server 103 from the client PC 108.

A request ID 703 is an ID corresponding to the operation made by the user. More specifically, a unique request ID 703 is assigned to each request, such as a print request, a printing destination request, and registration of print setting information. The request ID 703 is issued from the client PC 108 to the print server 103. A user name 704 is the name of the user who instructed the request. Location information 705 is information specified when the request is issued by the user. The location information 705 indicates the installation location of the client PC 108 operated by the user. The printer management unit 205 compares the location information 705 in the request information 706 and the installation location 610 in the printer information 609. Then, the printer management unit 205 selects the installation location 610 which matches the location information 705, and obtains information about the printing capability 612 and the status 613 corresponding to the selected installation location 610.

Next, the printer management processing of the print server 103 will be described using the flowcharts of FIGS. 8 to 11. Further, the program of the print server 103 according to these flowcharts is, for example, stored in the HD 307 of the computer, read into the RAM 303, and executed by the CPU 301.

Figure 8:
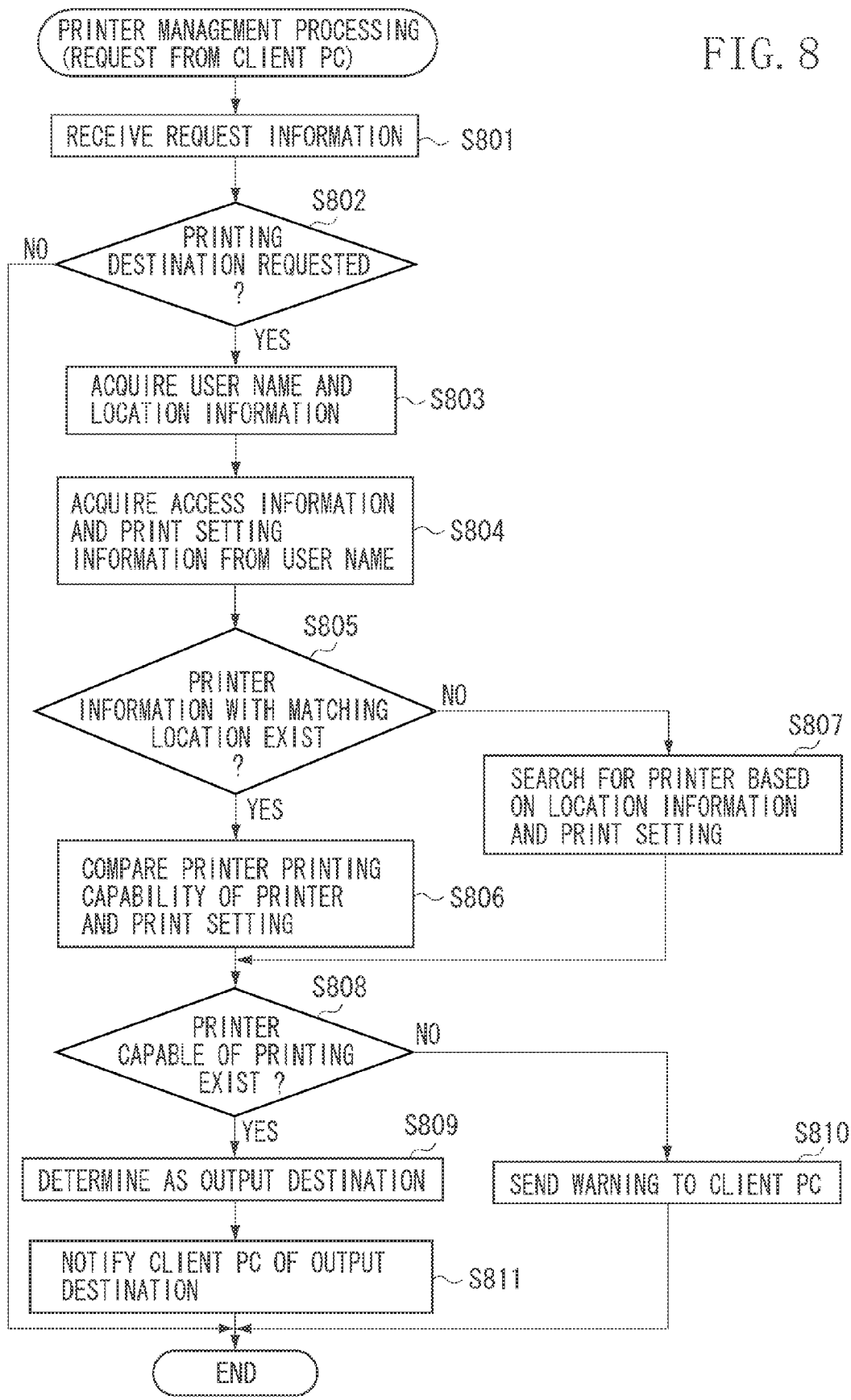
FIG. 8 is a flowchart illustrating printer management processing performed when request information is received.

FIG. 8 is a flowchart illustrating an example of the printer management processing performed when the request management unit 201 received request information 706 from the client PC 108.

First, in step S801, the request management unit 201 receives request information 706, such as a print request, registration of print setting information, and a printing destination request, from the client PC 108's web browser or the like. Thus, in the present exemplary embodiment, an example of a reception unit is realized by the processing of step S801, for example.

Next, in step S802, the request management unit 201 determines whether the request ID 703 included in the request information 706 received in step S801 is an ID assigned to a printing destination request. If it is determined that the request ID 703 is an ID assigned to a printing destination request (YES in step S802), the processing proceeds to step S803. Instep S803, the printer management unit 205 acquires the user name 704 and the location information 705 from the request information 706.

Next, in step S804, the printer management unit 205 specifies the user name 603 which matches the user name 704 acquired in step S803 from the database system 104. Further, the printer management unit 205 acquires the print setting information 601 and the access information 602 associated with the specified user name 603. Thus, in the present exemplary embodiment, an example of an acquisition unit is realized by the processing of step S804, for example.

Next, in step S805, the printer management unit 205 acquires from the printer information 609 the installation location 610 of the printer name 606 in the access information 602 acquired in step S804. Further, the printer management unit 205 determines whether there are any matches in the acquired installation location 610 with the location information 705 acquired in step S803. By performing the processing of step S805, the user can specify whether a printer arranged at an installation location of the client PC has been used in the past. If there is a match in the acquired installation location 610 with the location information 705 (YES in step S805), the processing proceeds to step S806. If there are no matches (NO in step S805), the processing proceeds to step S807. For example, if the location information 705 is base location B, room C, since the installation location of a multifunction peripheral (MFP) 100 described in the access information 602 is base location B, room C, it is determined that there is a match. Although an MFP 099 is also arranged in base location B, room C, since the MFP 099 is not included in the access information 602, the MFP 099 is excluded from this determination.

In step S806, the printer management unit 205 compares the printing capability 612 of the printer arranged at the installation location 610 for which a match was found in step S805, and the print setting 604 included in the print setting information 601 set by the user. If there is a plurality of printers at the installation location 610 for which a match was found in step S805, the printer management unit 205 performs the following processing. Specifically, the printer management unit 205 selects preferentially printers having a newer last access date 607, and compares the printing capability 612 and the print setting 604 of the selected printer. Since this processing allows a recently used printer to be recommended to the user, the user can easily specify the location of the printer. Then, the processing proceeds to step S808. On the other hand, if the processing proceeds to step S807, the printer management unit 205 searches the printer information 609 for a printer matching the location information 705 acquired in step S803 and the print setting 604 included in the print setting information 601 set by the user. Then, the processing proceeds to step S808. For example, if the location information 705 is base location A, room Z, although a single function printer (SFP) 098 is arranged in the base location A, room Z, because the SFP 098 is not included in the access information 602, in step S805, the printer management unit 205 determines that there is no match (NO in step S805). Subsequently, in step S807, the SFP 098 which has not been accessed in the past, is arranged in base location A, room Z. If "base location A, room Z: monochrome single-sided" is included in the print setting information, the printer management unit 205 specifies the SFP 098 in step S807.

In step S808, the printer management unit 205 determines whether there is a printer available for printing. If the processing proceeds from step S806 to step S808, and the printer management unit 205 determines that there is a printing capability 612 which satisfies the print setting 604, the printer management unit 205 determines that there is a printer available for printing (YES in step S808). If the printer management unit 205 determines that there is a printer available for printing, the processing proceeds to step S809. In step S809, the printer management unit 205 determines that that printer is a printer available for printing, and determines the printer to be the output destination (printing execution destination) for the user's print setting 604. Thus, in the present exemplary embodiment, an example of a specifying unit is realized by the processing of step S805, for example, and an example of a determination unit is realized by the processing of steps S806, S808, and S809, for example.

Next, in step S811, the request management unit 201 notifies the client PC 108, which is the sending source of the request information 706 received in step S801, about the output destination determined in step S809. On the other hand, in step S808, if it is determined that there is no printer capable of printing (NO in step S808), the processing proceeds to step S810. In step S810, the request management unit 201 warns the client PC 108, which is the sending source of the request information 706 received in step S801, that there is no printer capable of printing.

Thus, a printing destination matching the print setting 604 is automatically determined using the location information 705 for the user executing printing and the history about previously used printers (access information 602). Consequently, normal printing can be performed even when the user changes the output location of a print product. Further, since the output destination is determined based on the access information, a chance is small that a print product will be printed at an output destination which is completely unknown to the user.

Figure 9:
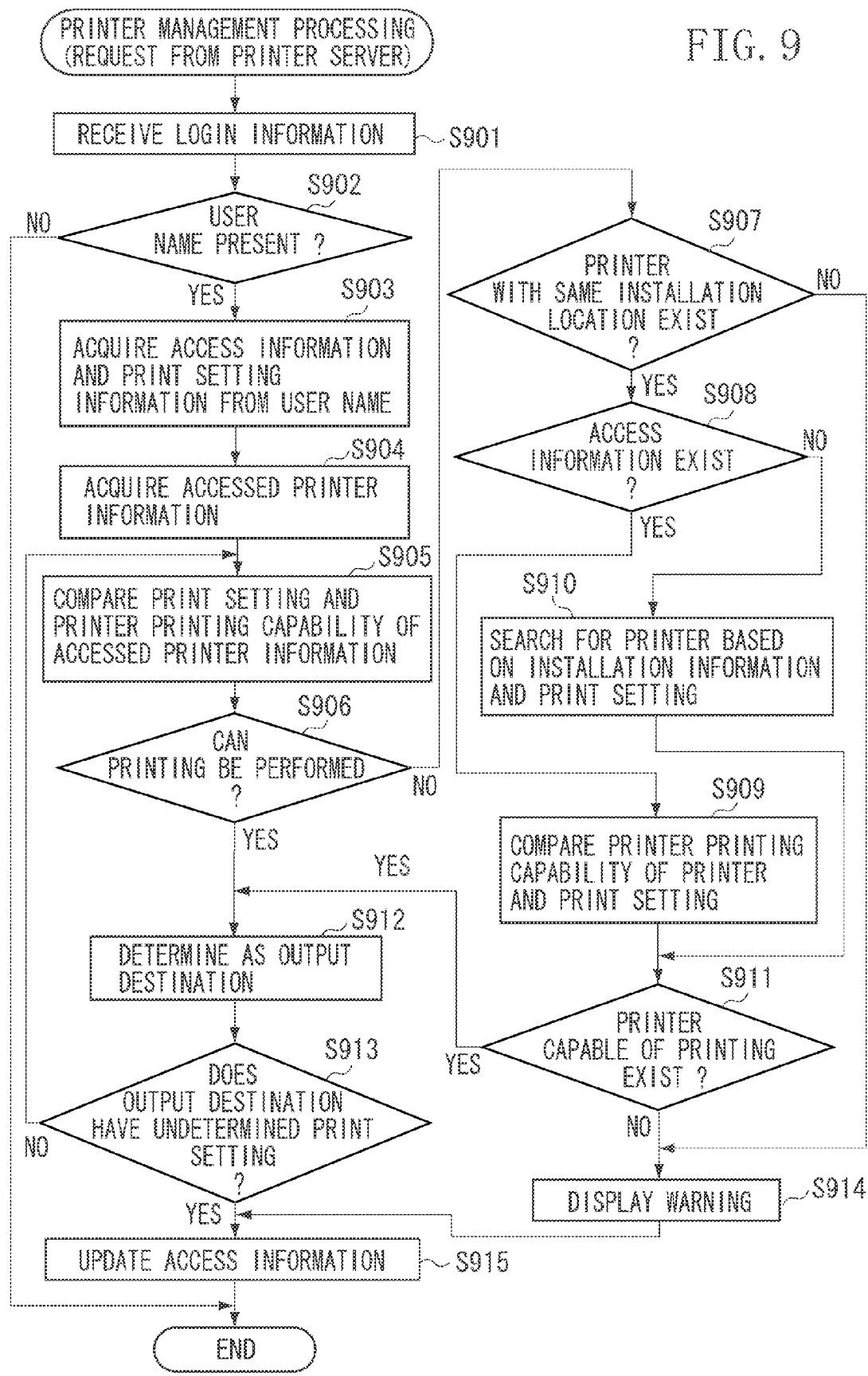
FIG. 9 is a flowchart illustrating printer management processing performed when login information is received.

FIG. 9 is a flowchart illustrating an example of the printer management processing performed when the request management unit 201 receives login information 700 from the printer 107.

First, in step S901, the request management unit 201 receives from the printer 107 the login information 700 obtained during login to the printer 107. As described above, when the user logs in to the printer 107 using the operation unit 406 or the external interface 408, the printer 107 notifies the print server 103 about the login information 700 via the interface 404. Thus, in the present exemplary embodiment, an example of a reception unit is realized by the processing of step S901, for example.

Next, in step S902, the printer management unit 205 determines whether user information 600 is present in the database system 104 using the user name 702 of the login information 700. If it is determined that user information 600 corresponding to the user name 702 of the login information 700 is present (YES in step S902), the processing proceeds to step S903. On the other hand, if it is determined that user information 600 corresponding to the user name 702 of the login information 700 is not present (NO in step S902), the processing performed in the flowchart of FIG. 9 is finished.

In step S903, the printer management unit 205 acquires the print setting information 601 and the access information 602 associated with user information 600 corresponding to the user name 702 of the login information 700. Thus, in the present exemplary embodiment, an example of an acquisition unit is realized by the processing of step S903, for example. Next, in step S904, the printer management unit 205 acquires the printer information 609 corresponding to the printer name 701 in the login information 700 from the database system 104. Then, in step S905, the printer management unit 205 performs the following processing. Specifically, the printer management unit 205 compares the usage location 605 in the print setting information 601 acquired in step S903 and the installation location 610 in the printer information 609 acquired in step S904. Then, the printer management unit 205 specifies the print setting information set by same installation location as the installation location 610 in the printer information 609. Subsequently, the printing capability in the printer information 609 and the specified print setting information are compared. Next, in step S906, based on the result of the comparison performed in step S905, the printer management unit 205 determines whether the printing capability of the printer to which the login information was sent satisfy the print setting 604. If it is determined that there is a printer having a printing capability 612 which satisfies the print setting 604 (YES in step S906), the processing proceeds to step S912. On the other hand, if the printer to which the login information was sent does not satisfy the print setting 604 (NO in step S906), the processing proceeds to step S907.

In step S912, the printer management unit 205 sets the printer to which the login information was sent as the output destination of the print setting 604. Then, the processing proceeds to the below-described step S913.

On the other hand, if the processing proceeds to step S907, the printer management unit 205 searches the printer information 609 for another printer having the same installation location as the installation location 610 in the printer information 609 acquired in step S904. If it is determined that there is another printer in the same installation location as the installation location 610 in the printer information 609 (YES in step S907), the processing proceeds to step S908, while if it is determined that there is no such other printer (NO in step S907), the processing proceeds to the below-described step S914. In step S908, the printer management unit 205 searches whether the printer name 611 of the printer found in step S907 is in the printer name 606 of the access information 602. If it is determined that the printer name 611 of the printer found in step S907 is in the printer name 606 of the access information 602 (YES in step S908), the processing proceeds to step S909. If it is determined that this print name 611 is not in the printer name 606 of the access information 602 (NO in step S908), the processing proceeds to step S910. Regarding steps S909 to S911 and step S914, since their processing is the same as that of steps S806 to S808 and step S810 in FIG. 8, a detailed description thereof will be omitted here.

If it is determined in step S911 that there is a printer available for printing, the processing proceeds to step S912. In step S912, the printer management unit 205 sets that printer as the output destination for the print setting 604. Then, the processing proceeds to step S913. Thus, in the present exemplary embodiment, an example of a specifying unit is realized by the processing of steps S904 and S907, for example, and an example of a determination unit is realized by the processing of steps S907 to S909, S911, and S912, for example.

In step S913, the printer management unit 205 determines whether there are any undetermined output destinations corresponding to the print setting 604 of the logged-in user. If there is a print setting 604 having an undetermined output destination (YES in step S913), the processing returns to step S905. If there are no print settings 604 having an undetermined output destination (NO in step S913), the processing proceeds to step S915. In step S915, the printer management unit 205 updates the last access date 607 and the access number 608 of the access information 602 corresponding to the user name 704 in the login information 700.

Thus, when the user logs in to the printer 107, by determining that printer 107 as the printing destination for the print setting information, the print result intended by the user can be obtained at the output destination intended by the user.

Figure 10:
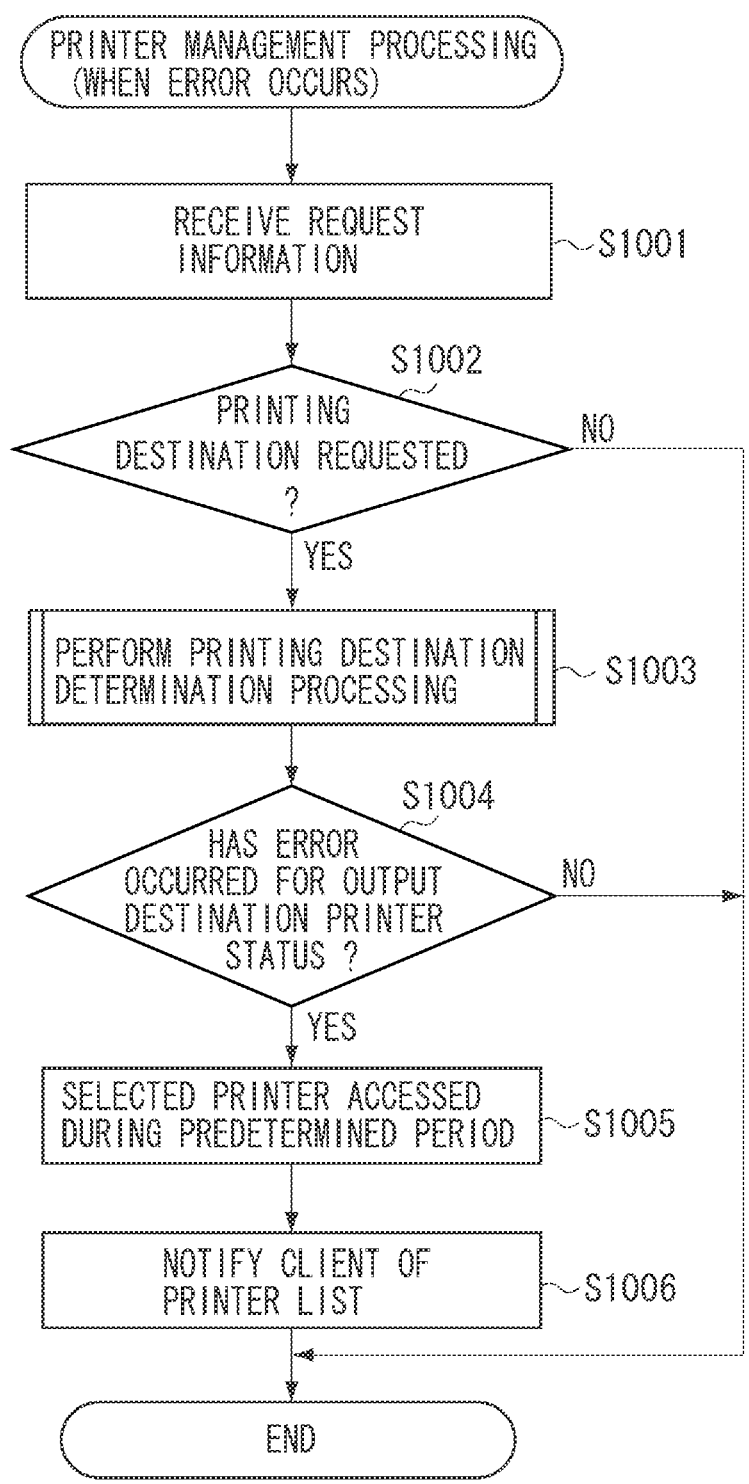
FIG. 10 is a flowchart illustrating printer management processing performed when an error occurs.

FIG. 10 is a flowchart illustrating an example of the printer management processing performed when an error occurs in the printer 107 managed by the printer management unit 205. As described above, when an error occurs in the printer 107, the device control unit 204 updates the status 613 of the printer information 609.

First, in step S1001, as described in FIG. 8, the request management unit 201 receives request information 706 from the client PC 108. Thus, in the present exemplary embodiment, an example of a reception unit is realized by the processing of step S1001, for example. Next, in step S1002, the request management unit 201 determines whether the request ID 703 included in the request information 706 received instep S1001 is an ID assigned to a printing destination request.

If it is determined that the request ID 703 is an ID assigned to a printing destination request (YES in step S1002), the processing proceeds to step S1003. On the other hand, if it is determined that the request ID 703 is not an ID assigned to a printing destination request (NO in step S1002), the processing performed in the flowchart illustrated in FIG. 10 is finished. In step S1003, the printer management unit 205 performs printing destination determination processing. Since this printing destination determination processing is the same as the processing performed in steps S803 to S811 illustrated in FIG. 8, a detailed description thereof will be omitted here. In step S1004, the printer management unit 205 acquires the status 613 of the printer determined by the printing destination determination processing of step S1003. Then, the printer management unit 205 determines whether an error has occurred in the printer determined as the output destination based on the acquired status 613. If it is determined that an error has occurred in the printer determined as the output destination (YES in step S1004), the processing proceeds to step S1005. If it is determined that an error has not occurred (NO in step S1004), the processing performed in the flowchart illustrated in FIG. 10 is finished. Thus, in the present exemplary embodiment, an example of a second determination unit is realized by the processing of step S1004, for example.

In step S1005, the printer management unit 205 acquires the last access date 607 in the access information 602, and selects all of the printers which were accessed within a predetermined period. This predetermined period may be specified by the user when making the printing destination request, or maybe set beforehand in the print server 103. Thus, in the present exemplary embodiment, an example of a second acquisition unit is realized by the processing of step S1005, for example. Next, in step S1006, the request management unit 201 notifies the client PC 108 about a list of the printers (all of the printers) selected in step S1005. Thus, in the present exemplary embodiment, an example of a notification unit is realized by the processing of step S1006, for example. After the printer list (all of the printers) is notified, the printer management unit 205 acquires information about a printer selected by the user from within that list, and determines that printer to be the new output destination.

Thus, when an error has occurred in a printer, by notifying the user about a list of printers which were previously accessed, the user can easily change the printing destination from among the known printers.

Figure 11:
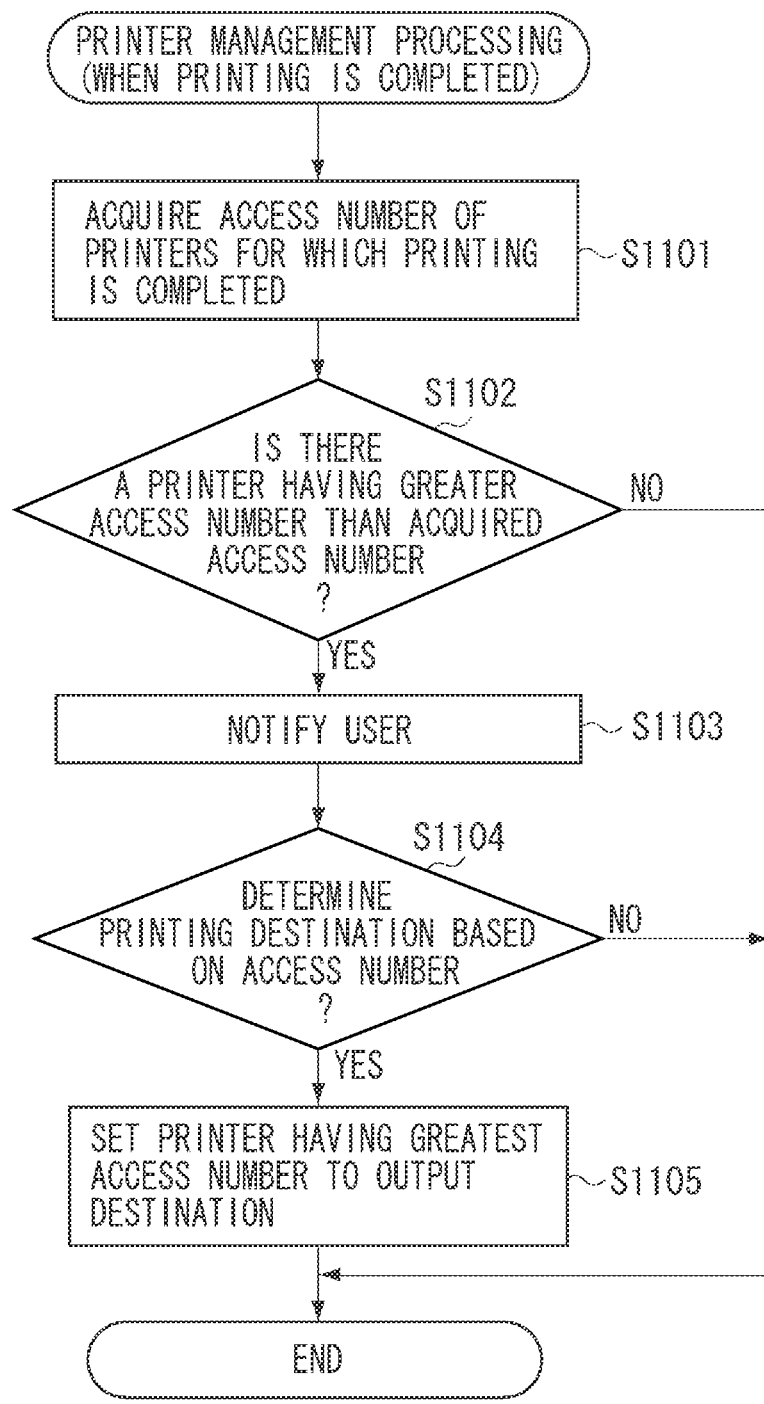
FIG. 11 is a flowchart illustrating printer management processing performed when printing is completed.

FIG. 11 is a flowchart illustrating an example of the printer management processing performed when printing is completed.

First, in step S1101, when the printer management unit 205 receives a notification from the job control unit 202 that printing is completed, the printer management unit 205 acquires the access number 608 corresponding to the printer name of the printer in which printing is completed. Next, in step S1102, the printer management unit 205 determines whether there is a printer having a greater access number than the access number 608 acquired in step S1101 in the access information 602. If it is determined that there is a printer having a greater access number than the access number 608 acquired in step S1101 (YES in step S1102), the processing proceeds to step S1103. If it is determined that there is no such printer (NO in step S1102), the processing performed in the flowchart illustrated in FIG. 11 is finished. Thus, in the present exemplary embodiment, an example of a third acquisition unit is realized by the processing of steps S1101 and S1102, for example.

Figure 12:
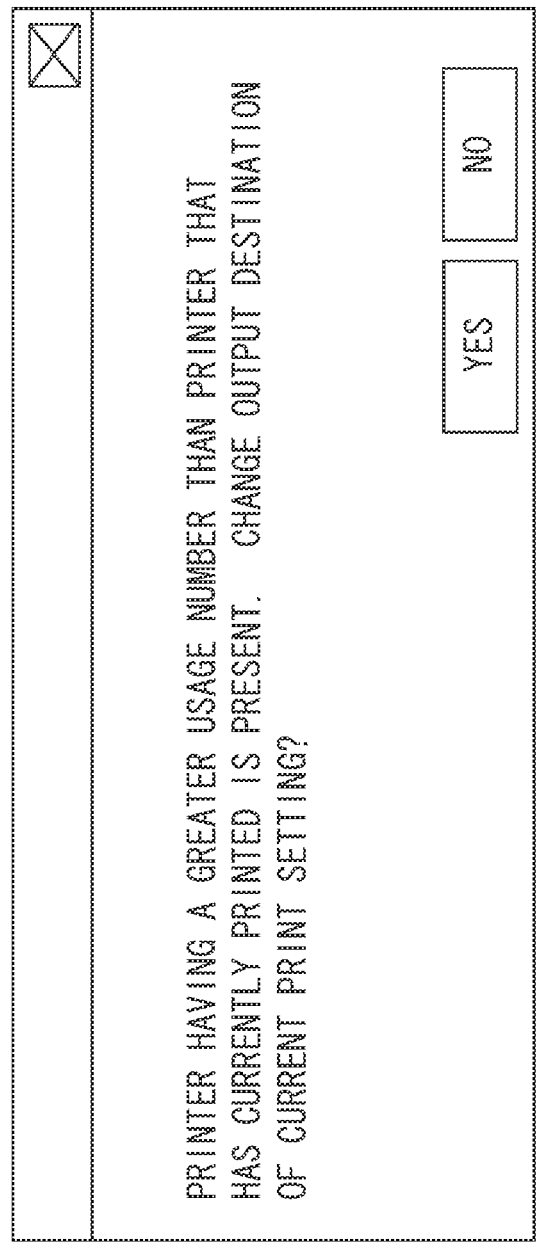
FIG. 12 illustrates a message asking a user whether a printing destination is to be determined based on an access number.

In step S1103, the request management unit 201 notifies the user of the fact that there is a printer having a greater access number, and asks the user whether the output destination determination is to be based on the access number. FIG. 12 illustrates an example of a message asking whether the printing destination determination is to be based on the access number. Next, in step S1104, the request management unit 201 receives the selection made by the user concerning determination of the printing destination, and based on the received information, determines whether to determine the printing destination based on the access number. If it is determined that the printing destination is to be determined based on the access number (YES in step S1104), the processing proceeds to step S1105. If it is determined that the printing destination is not to be determined based on the access number (NO in step S1104), the processing performed in the flowchart of FIG. 11 is finished. In step S1105, the printer management unit 205 changes the output destination of the applicable print setting 604 from the printer which has completed printing to the printer having the greatest access number 608. Thus, in the present exemplary embodiment, an example of a change unit is realized by the processing of step S1105, for example.

Thus, after printing is finished, the processing causes the user to select whether to determine the printer having the greatest access number as the printing destination. By doing this, when the user temporarily performed printing with another printer, the effort of re-setting the printing destination printer to the normally used printer can be eliminated. Although in the present exemplary embodiment the processing causes the user to select whether to determine the printer having the greatest access number as the printing destination, the printer having the greatest access number can be involuntarily (automatically) determined as the printing destination.

FIG. 13 illustrates an example of a user interface on a web browser which the user operates. The user performs an operation to issue the request information 706, such as registration of print setting information and a printing destination request, to the print server 103 by operating user interfaces 1300, 1308, and 1309.

Figure 13A:
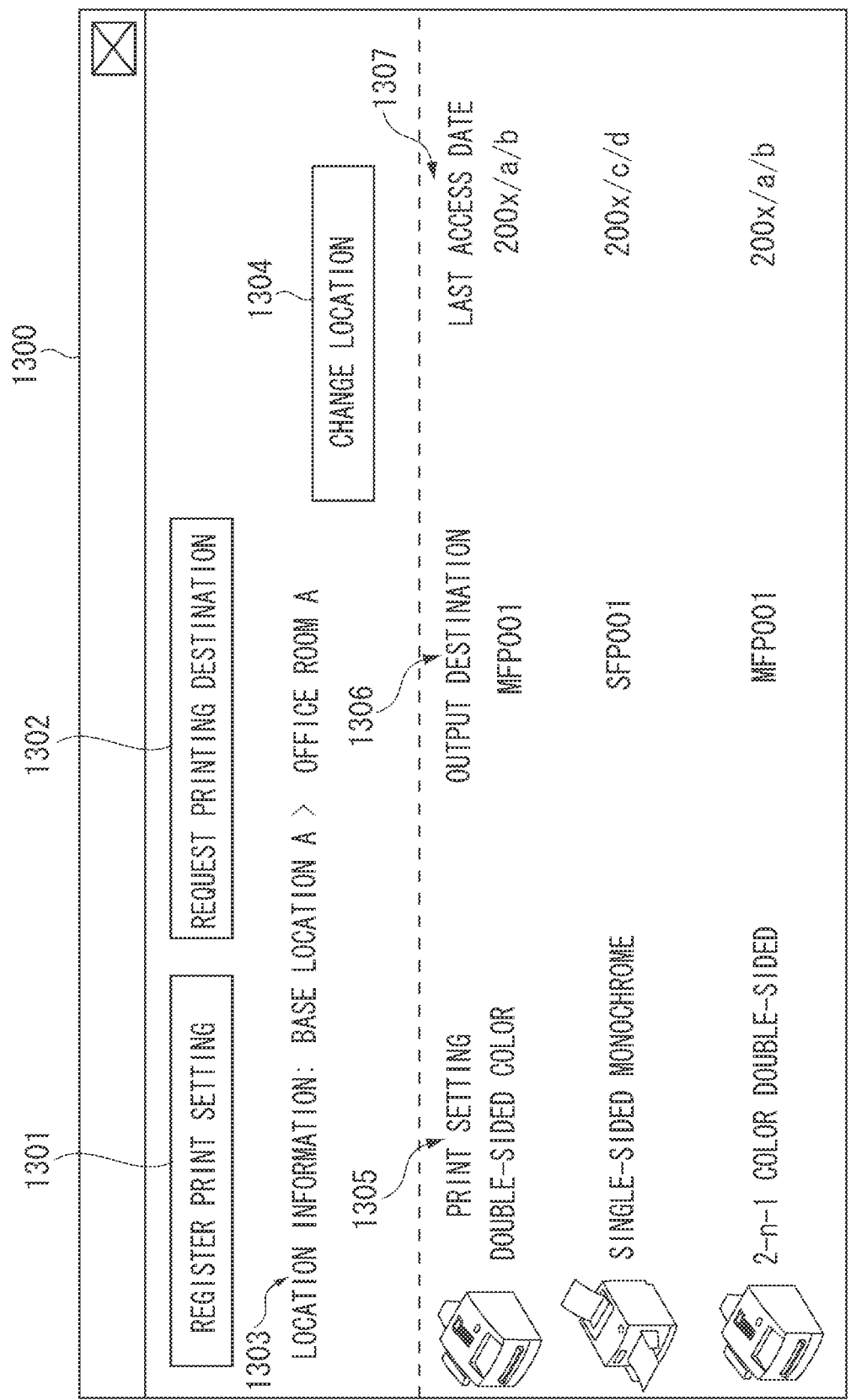
Figure 13C:
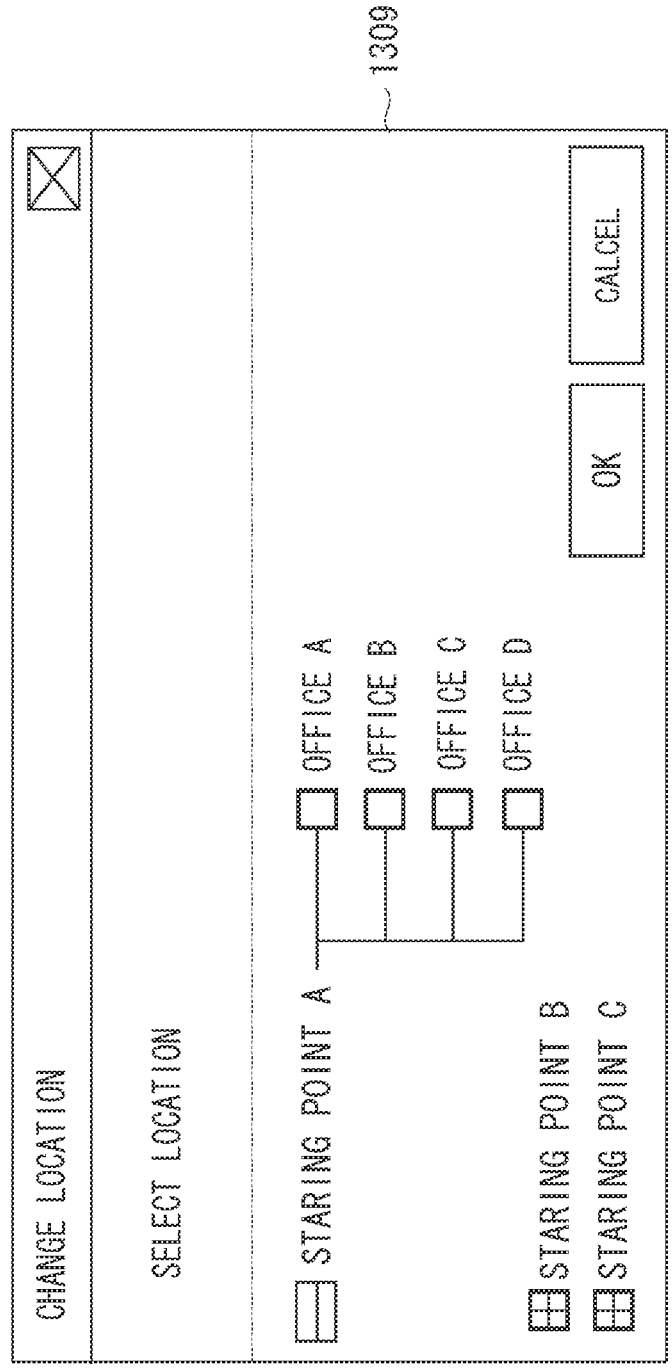

In FIG. 13A, a button 1301 is a button for registering print setting information. When the user presses the button 1301, a print setting window 1308 illustrated in FIG. 13B opens. The print setting selected by the user in the print setting window 1308 is notified to the print server 103, and registered as the print setting 604. A button 1302 is a button for performing a print destination request. When the user presses the button 1302, the request information 706 is notified to the print server 103, and the output destination corresponding to the print setting is determined through the above-described printer management processing. Location information 705 indicating the installation location of the client PC 108 operated by the user is displayed in a region 1303. This location information 705 is notified to the print server 103 as location information 705 for the request information 706 during the printing destination request. A button 1304 is a button for changing the location information 705. When the user presses the button 1304, a location change setting window 1309 illustrated in FIG. 13C opens. The location information 705 is updated to the location information selected by the user in the location change setting window 1309. The print setting 604 registered in the print server 103 is displayed in a region 1305. The output destination determined through the above printer management processing is displayed for each print setting in a region 1306. The last access date 607 in the access information 602 is displayed in a region 1307.

Thus, in the present exemplary embodiment, as to a print request from the client PC 108, the printing destination is determined in the following manner. Specifically, among the printers 107 which were accessed by the user who is the request source, and are at the same location as that specified when the user made the print request, the printer 107 available for printing based on the print setting corresponding to that user is determined as the printing destination. At this stage, the printer 107 accessed by the user the greatest number of times is preferentially determined as the printing destination. Further, as to a print request from the printer 107, the printing destination is determined in the following manner. Specifically, first, when printing can be performed based on the print setting corresponding to the user who is the request source, that printer 107 is determined as the printing destination. On the other hand, when printing cannot be performed based on the print setting registered by the user who is the request source, the printing destination is determined as follows. Specifically, among the printers 107 which were accessed by the user who is the request source, and are at the same location as that specified by the user in the print setting, the printer 107 available for printing based on the print setting corresponding to that user is determined as the printing destination. At this stage too, the printer 107 which was accessed by the user the greatest number of times is preferentially determined as the printing destination. Therefore, even if the user's printing environment changes, the user's printing environment can be easily set, thus allowing the intended print result to be obtained at the intended output destination.

Further, in the present exemplary embodiment, when an error has occurred in the status (condition) of the printer 107 determined as the printing destination, and printing cannot be performed, a list of the printers 107 accessed by the user within a predetermined period is notified to the user, and the user is prompted to re-select the output destination. Therefore, cases in which the user has to repeatedly go to a printer in which an error occurred can be decreased.

In addition, in the present exemplary embodiment, after printing based on the print setting made by the user is finished, the processing causes the user to select whether to change the output destination corresponding to that print setting, to the printer 107 having a greater access number than the printer 107 which performed that printing. Therefore, the burden for the user of re-setting the output destination can be reduced.

According to the present invention, a printing apparatus, which has been used by the user who made the print request and which can print based on the print setting registered by that user, is determined as the execution destination of printing based on the above request. Therefore, a situation in which printing is performed by a printing apparatus unknown to the user can be automatically suppressed. Accordingly, printing can be easily performed at the printing apparatus intended by the user.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-214744 filed Sep. 16, 2009, which is hereby incorporated by reference herein in its entirety.

What is claimed is:

1. A printing control apparatus, comprising:
a reception unit configured to receive a print request from a user;
an acquisition unit configured to acquire a printing apparatus usage history of the user who made the print request and print setting information registered by the user who made the print request;
a determination unit configured to determine, based on the usage history and the print setting information acquired by the acquisition unit, a printing apparatus which has been used by the user who made the print request and which is capable of printing based on the print setting information registered by that user, as an execution destination for printing based on the print request;
a second determination unit configured to determine whether the printing apparatus determined by the determination unit is in a state capable of printing;
a second acquisition unit configured to, if it is determined by the second determination unit that the determined printing apparatus is not capable of printing, acquire information concerning printing apparatuses used by the user who made the print request within a predetermined period based on usage information about the printing apparatuses by the user who made the print request; and
a notification unit configured to notify the user who made the print request of the information concerning printing apparatuses acquired by the second acquisition unit.

2. The printing control apparatus according to claim 1, further comprising a specifying unit configured to specify a printing apparatus arranged in a location designated by a user, wherein
the determination unit is configured to determine, based on the usage history and the print setting information acquired by the acquisition unit, and based on the printing apparatus specified by the specifying unit, a printing apparatus which has been used by the user who made the print request and which is capable of printing based on the print setting information registered by that user, as an execution destination for printing based on the print request.

3. The printing control apparatus according to claim 1, further comprising:
a storage unit configured to associate the print setting information with information concerning the printing apparatus which performed printing based on the print setting information, and store the associated information;
a third acquisition unit configured to acquire, based on usage information about the printing apparatus by the user who made the print request, information concerning a printing apparatus which the user has used a greater number of times than the printing apparatus which performed printing based on the print request made by the user; and
a change unit configured to change information concerning the printing apparatus associated with the print setting information when printing is performed, to information concerning the printing apparatus acquired by the third acquisition unit.

4. A method for controlling printing, comprising:
receiving a print request from a user;
acquiring a printing apparatus usage history of the user who made the print request and print setting information registered by the user who made the print request;

determining, based on the acquired usage history and print setting information, a printing apparatus which has been used by the user who made the print request and which is capable of printing based on the print setting information registered by that user, as an execution destination for printing based on the print request determining whether the printing apparatus determined is in a state capable of printing;

if it is determined by the determining that the determined printing apparatus is not capable of printing, acquire information concerning printing apparatuses used by the user who made the print request within a predetermined period based on usage information about the printing apparatuses by the user who made the print request; and notifying the user who made the print request of the information concerning printing apparatuses acquired.

5. A non-transitory storage medium storing a program for executing on a computer that causes the computer to perform the steps of:

receiving a print request from a user;

acquiring a printing apparatus usage history of the user who made the print request and print setting information registered by the user who made the print request; and determining, based on the acquired usage history and print setting information, a printing apparatus which has been used by the user who made the print request and which is capable of printing based on the print setting information registered by that user, as an execution destination for printing based on the print request;

determining whether the printing apparatus determined is in a state capable of printing;

if it is determined by the determining that the determined printing apparatus is not capable of printing, acquire information concerning printing apparatuses used by the user who made the print request within a predetermined period based on usage information about the printing apparatuses by the user who made the print request; and notifying the user who made the print request of the information concerning printing apparatuses acquired.

* * * * *